(12) United States Patent
Henry

(10) Patent No.: US 10,183,448 B2
(45) Date of Patent: *Jan. 22, 2019

(54) BACK SEAM WELDER AND METHOD OF OPERATION

(71) Applicant: MILLER WELDMASTER CORPORATION, Navarre, OH (US)

(72) Inventor: Brian D. Henry, North Lawrence, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/091,169

(22) Filed: Apr. 5, 2016

(65) Prior Publication Data

US 2016/0214315 A1 Jul. 28, 2016

Related U.S. Application Data

(63) Continuation of application No. 14/253,325, filed on Apr. 15, 2014, now Pat. No. 9,358,748.

(Continued)

(51) Int. Cl.
| | |
|---|---|
| B31B 70/00 | (2017.01) |
| B29C 65/00 | (2006.01) |
| B29C 65/18 | (2006.01) |
| B29C 65/56 | (2006.01) |
| B29C 65/72 | (2006.01) |
| B29C 65/74 | (2006.01) |
| B29L 31/00 | (2006.01) |
| B31B 160/10 | (2017.01) |
| B31B 155/00 | (2017.01) |
| B31B 70/64 | (2017.01) |
| B31B 150/00 | (2017.01) |

(52) U.S. Cl.
CPC .......... B29C 66/8511 (2013.01); B29C 65/18 (2013.01); B29C 65/56 (2013.01); B29C 65/72 (2013.01); B29C 65/74 (2013.01); B29C 66/83413 (2013.01); B29C 66/87 (2013.01); B31B 70/00 (2017.08); B29C 66/4312 (2013.01); B29K 2623/12 (2013.01); B29L 2031/7128 (2013.01); B31B 70/642 (2017.08); B31B 70/643 (2017.08); B31B 70/644 (2017.08); B31B 2150/002 (2017.08); B31B 2155/00 (2017.08); B31B 2160/10 (2017.08)

(58) Field of Classification Search
CPC .......................... B29C 66/431; B29C 66/4312
USPC ................ 156/251, 324, 714, 716, 752–753
See application file for complete search history.

(56) References Cited

U.S. PATENT DOCUMENTS

| | | |
|---|---|---|
| 3,054,242 A | 9/1962 | Harrison et al. |
| 3,286,433 A | 11/1966 | Johnson et al. |

(Continued)

FOREIGN PATENT DOCUMENTS

WO 2011072801 6/2011

*Primary Examiner* — Scott W Dodds
(74) *Attorney, Agent, or Firm* — Sand & Sebolt

(57) ABSTRACT

A thermal welder is configured to weld a back seam of a bag formed of thermoplastic sheet material. The welder may include a weld heater and a compression mechanism downstream of the weld heater to compress the sheet material to form the back seam. The welder may also include a weld breaker downstream of the compression mechanism to break apart incidental welds which are formed adjacent the back seam.

19 Claims, 13 Drawing Sheets

Related U.S. Application Data

(60) Provisional application No. 61/811,997, filed on Apr. 15, 2013.

(56) References Cited

U.S. PATENT DOCUMENTS

| | | | |
|---|---|---|---|
| 3,381,448 | A | 5/1968 | Ayres et al. |
| 3,527,633 | A | 9/1970 | Bertoglio |
| 3,537,360 | A | 11/1970 | Farnam |
| 3,608,709 | A | 9/1971 | Pike |
| 3,720,559 | A | 3/1973 | Odom et al. |
| 3,983,794 | A | 10/1976 | Buchner |
| 4,490,960 | A | 1/1985 | Klemesrud |
| 4,502,906 | A * | 3/1985 | Young ............... B29C 66/73713 156/251 |
| 4,961,805 | A * | 10/1990 | Siebert ................. B29C 35/04 156/251 |
| 5,890,348 | A | 4/1999 | Nutzi et al. |
| 6,113,526 | A | 9/2000 | Lotto |
| 7,857,135 | B2 | 12/2010 | Martin et al. |
| 2003/0215164 | A1 | 11/2003 | Stephany et al. |
| 2004/0250947 | A1 | 12/2004 | Phillips et al. |
| 2009/0013644 | A1 | 1/2009 | Yeager |
| 2009/0263048 | A1 | 10/2009 | Iannelli, II et al. |
| 2011/0036504 | A1 | 2/2011 | Phillips |

* cited by examiner

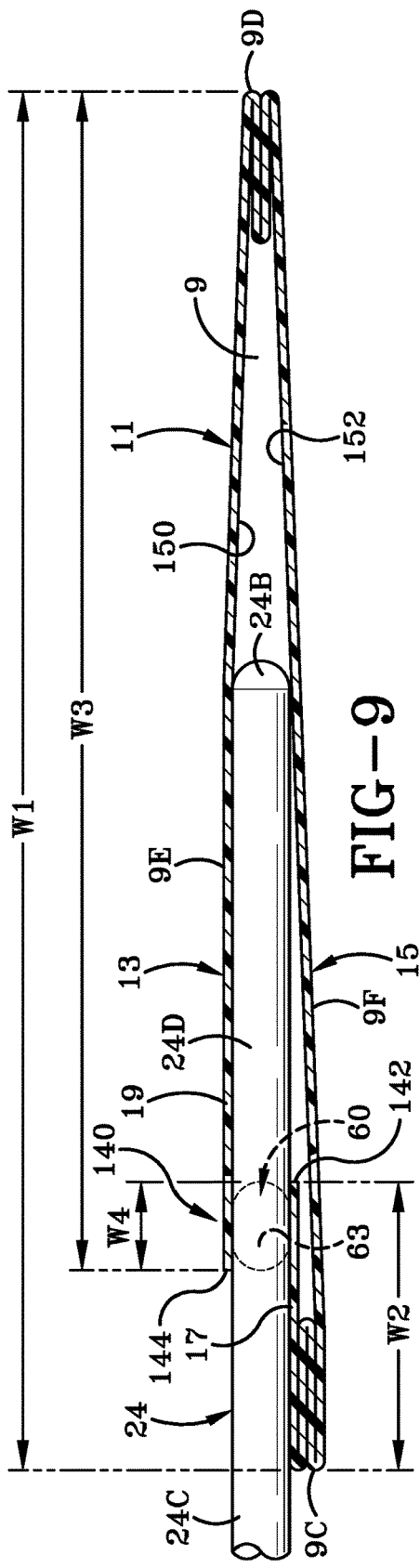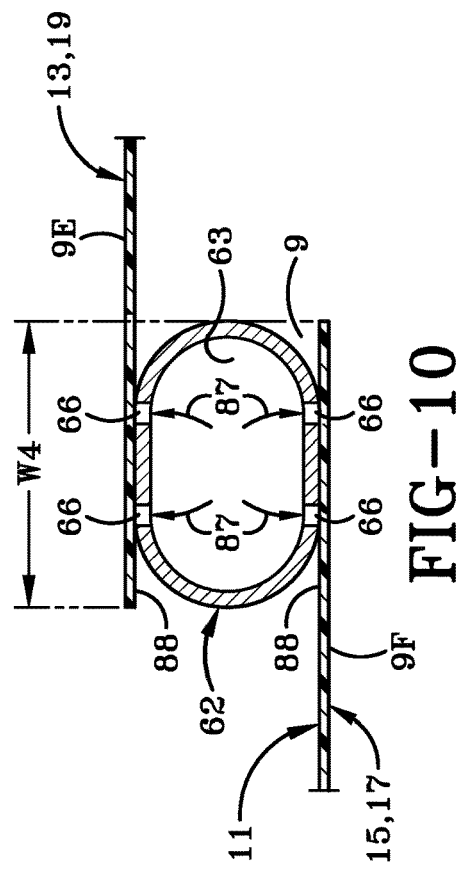

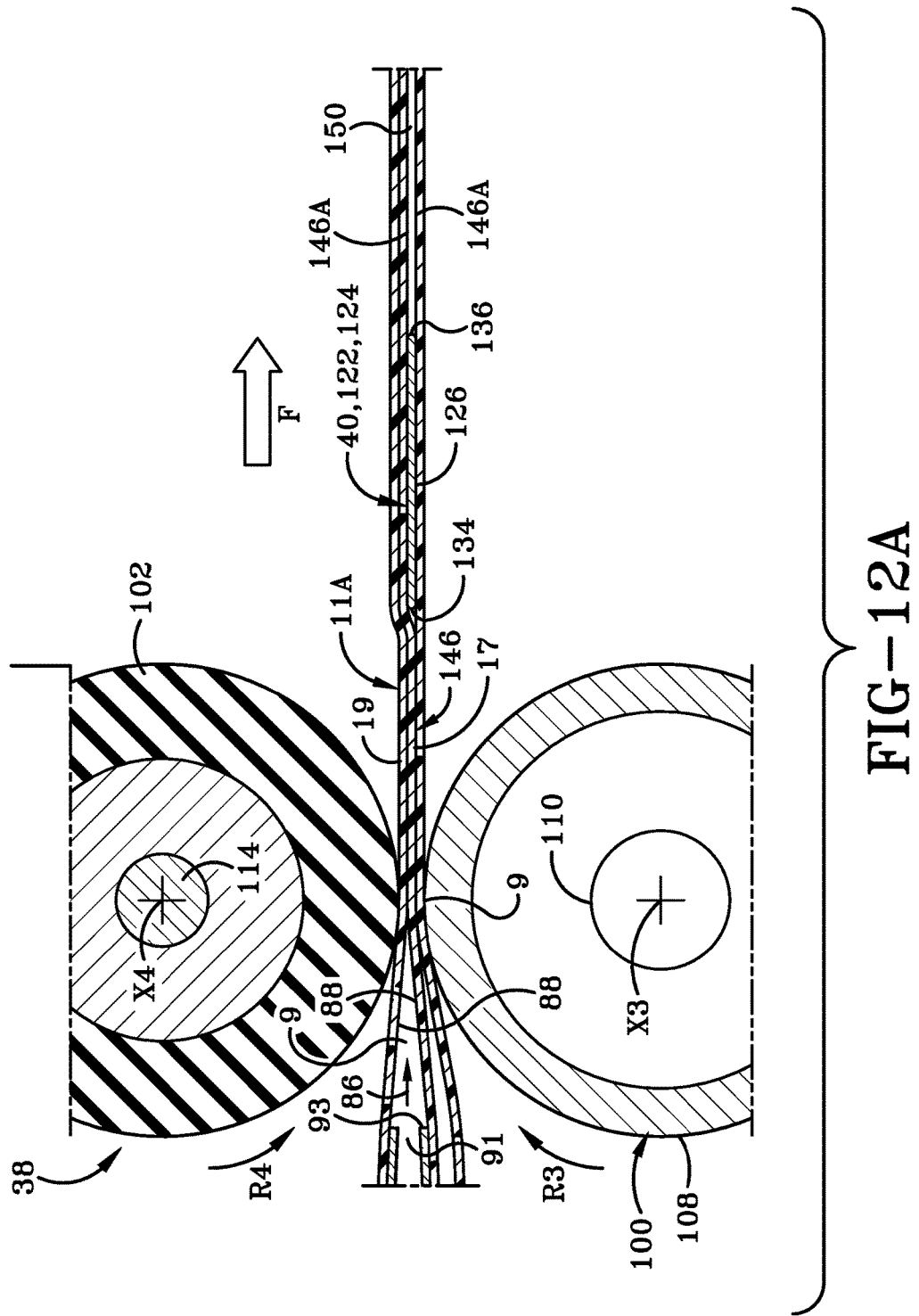

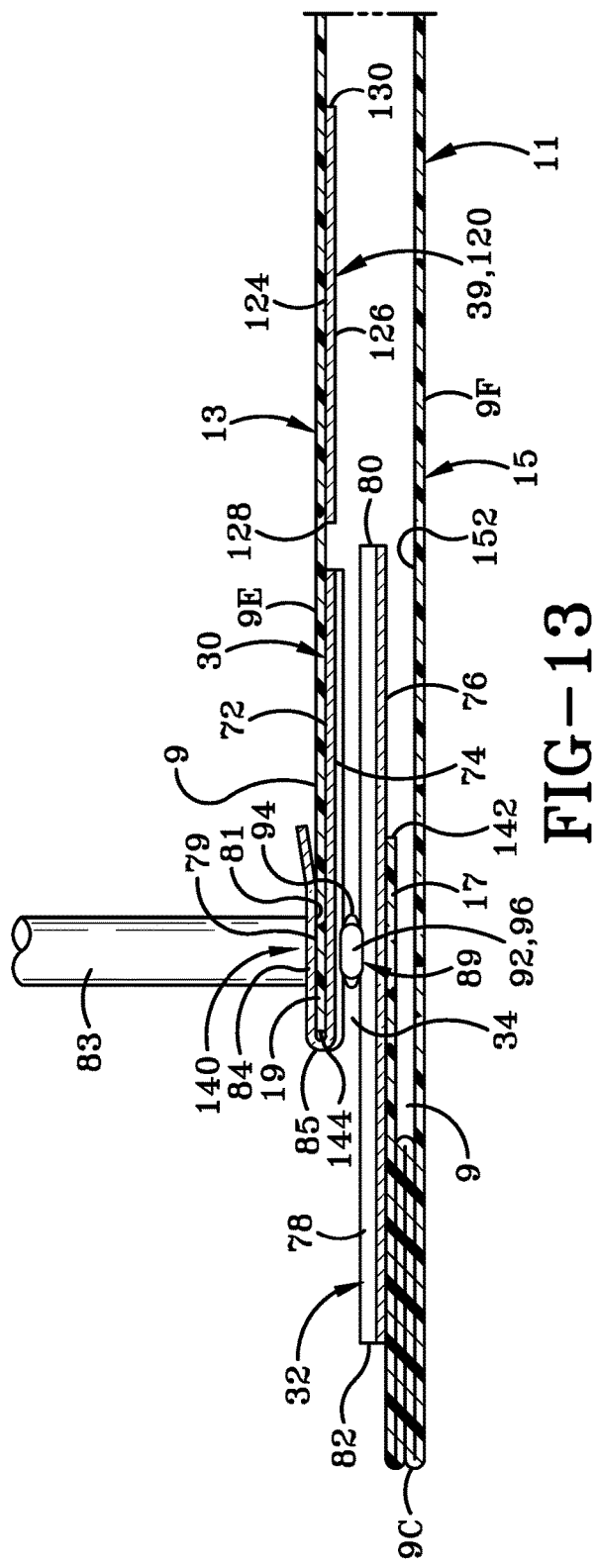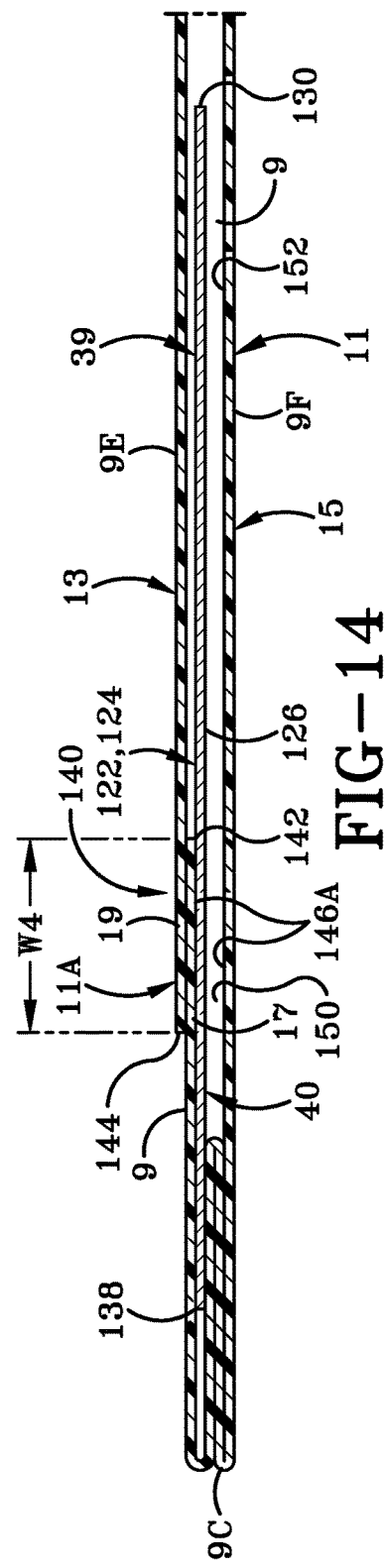

BACK SEAM WELDER AND METHOD OF OPERATION

CROSS-REFERENCE TO RELATED APPLICATIONS

This application is a continuation of U.S. patent application Ser. No. 14/253,325, filed Apr. 15, 2014, which application claims priority from U.S. Provisional Application Ser. No. 61/811,997, filed Apr. 15, 2013; the disclosures of which are incorporated herein by reference.

BACKGROUND OF THE INVENTION

Technical Field

The invention relates generally to a bag production machine and fabrication process. More particularly, the invention relates to a thermal welder for welding thermoplastic sheet material. Specifically, the invention relates to a thermal back seam welder and method which may be used to form polywoven bags.

Background Information

A great many types of bags are formed and manufactured along a production line. To properly store a material or liquid in such bags, seams created during the bag formation process must be properly sealed. Some machines form seams using adhesive, hot melt glue, stitching or some other material that is distinct and separate from the material that forms the panels of the bag itself. However, sealing or seaming machines have not been configured to weld or seal the back seam of a bag using only heat and compression to weld the back seam. Stated otherwise, sealing machines have not been configured to weld the back seam of a bag without using adhesive, hot melt glue, stitching or some other material that is distinct and separate from the bag material. The present invention addresses this and other issues.

SUMMARY

In one aspect, a thermal welding apparatus may comprise a sheet material pathway adapted to allow sheet material to move downstream therethrough; a weld heater extending adjacent the pathway; a compression mechanism extending adjacent the pathway adjacent and downstream of the weld heater; and a weld breaker assembly which comprises a first axial leg upstream of the compression mechanism, a second axial leg downstream of the compression mechanism, and a longitudinal leg extending from the first axial leg to the second axial leg; wherein the second axial leg serves as a weld breaker which is within the pathway and adapted to disengage incidental welds created during formation of a welded back seam of the sheet material as the sheet material is moving downstream through the pathway.

In another aspect, a combination may comprise flexible thermoplastic sheet material in a tubular configuration comprising first and second superimposed panels, wherein the second panel includes a first segment and a second segment overlapping the first segment along an overlap region; a thermal welding apparatus through which the sheet material is movable downstream; a weld heater of the thermal welding apparatus extending adjacent the overlap region; a compression mechanism of the thermal welding apparatus which is adjacent and downstream of the weld heater and which compresses the first and second segments and the first panel; a welded back seam formed between the first and second segments downstream of the compression mechanism; incidental welds formed between the welded back seam and the first panel; and a weld breaker assembly which comprises a first axial leg upstream of the compression mechanism and a second axial leg downstream of the compression mechanism, wherein the first axial leg extends between the first and second segments, the second axial leg extends between the welded back seam and the first panel, and the second axial leg serves as a weld breaker which disengages the incidental welds as the sheet material moves downstream.

BRIEF DESCRIPTION OF THE SEVERAL VIEWS OF THE DRAWINGS

One or more sample embodiments of the invention, illustrative of the best mode in which Applicant contemplates applying the principles, are set forth in the following description and are shown in the drawings and are particularly and distinctly pointed out and set forth in the appended claims.

FIG. 9 is an enlarged cross section taken along line 9-9 in FIG. 7 looking downstream.

FIG. 10 is an enlarged cross section taken along line 10-10 in FIG. 7 looking downstream.

FIG. 12A is a side cross section view taken along line 12A-12A in FIG. 11.

FIG. 13 is a cross section view looking downstream taken along line 13-13 in FIG. 11.

FIG. 14 is a cross section view facing downstream taken along line 14-14 in FIG. 11.

Similar numbers refer to similar parts throughout the drawings.

DETAILED DESCRIPTION

Figure 1:
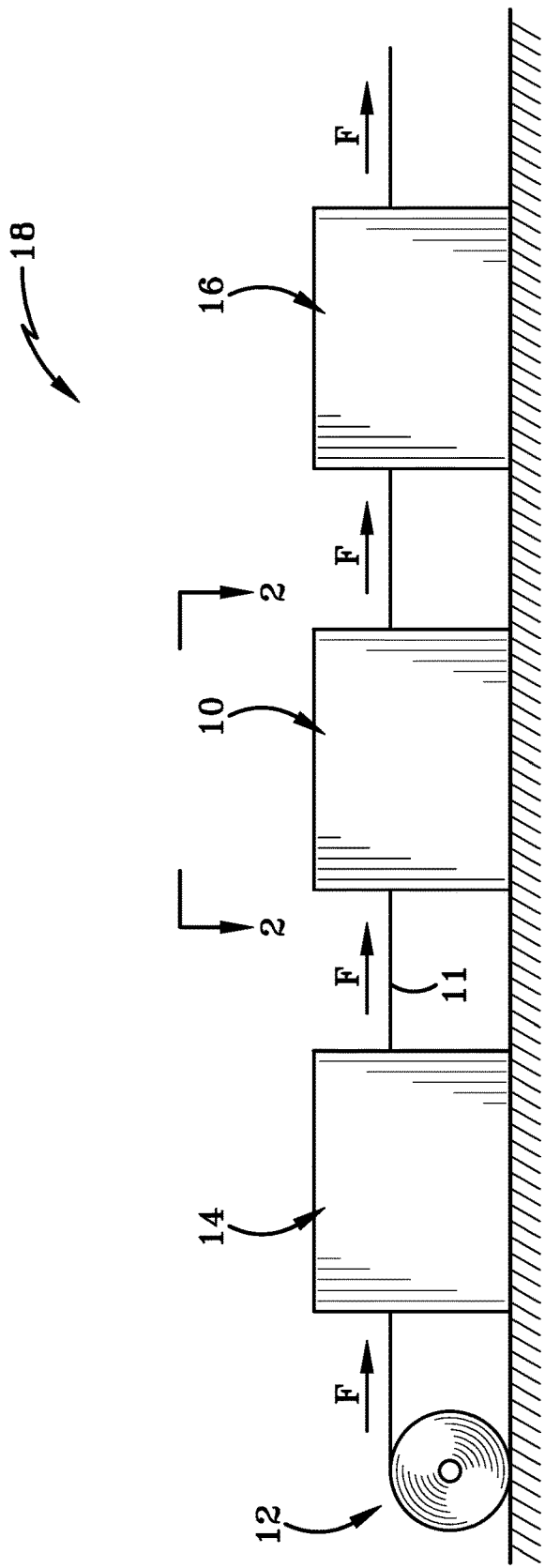
FIG. 1 is a diagrammatic side view of a bag manufacturing production line.

With primary reference to FIG. 1, a thermal welding apparatus or welder 10 is configured to weld a back seam 11A (FIG. 7) formed of flexible sheet material 11 which typically unrolls from a material roll 12 and moves in a downstream direction or flow stream (Arrows F) from upstream components 14 to downstream components 16 of a production line 18. Material 11 moves within a sheet material pathway 9 (FIGS. 2-14) having left and right sides 9C and 9D (FIG. 7) defining therebetween a width 9A (FIGS. 2, 7) and top and bottom boundaries 9E and 9F (FIGS. 8-10, 12-14) defining therebetween a thickness 9B (FIG. 8) which varies as material 11 moves in the downstream direction. Components 14 typically include a bag former or tuber configured to form sheet material into a tubular configuration which moves downstream through welder 10. Components 16 typically include a bottomer configured to form a seam along the bottom edge of the bag after back seam 11A has been formed. Back seam 11A is described in the U.S. patent application Ser. No. 14/253,387 titled "BAG WITH THERMAL WELDED BACK SEAM" which was filed on Apr. 15, 2014, published as US Patent Application Publication 2014/0307987, and is incorporated herein by reference as if fully rewritten herein. Flexible sheet material 11 is a thermoplastic material capable of being thermally welded to itself and typically strong enough to store a volume of bulk material when formed into a bag. Material 11 may be polypropylene although other thermoplastic materials may be used as well. Sheet material 11 may be a polywoven material.

Figure 2:
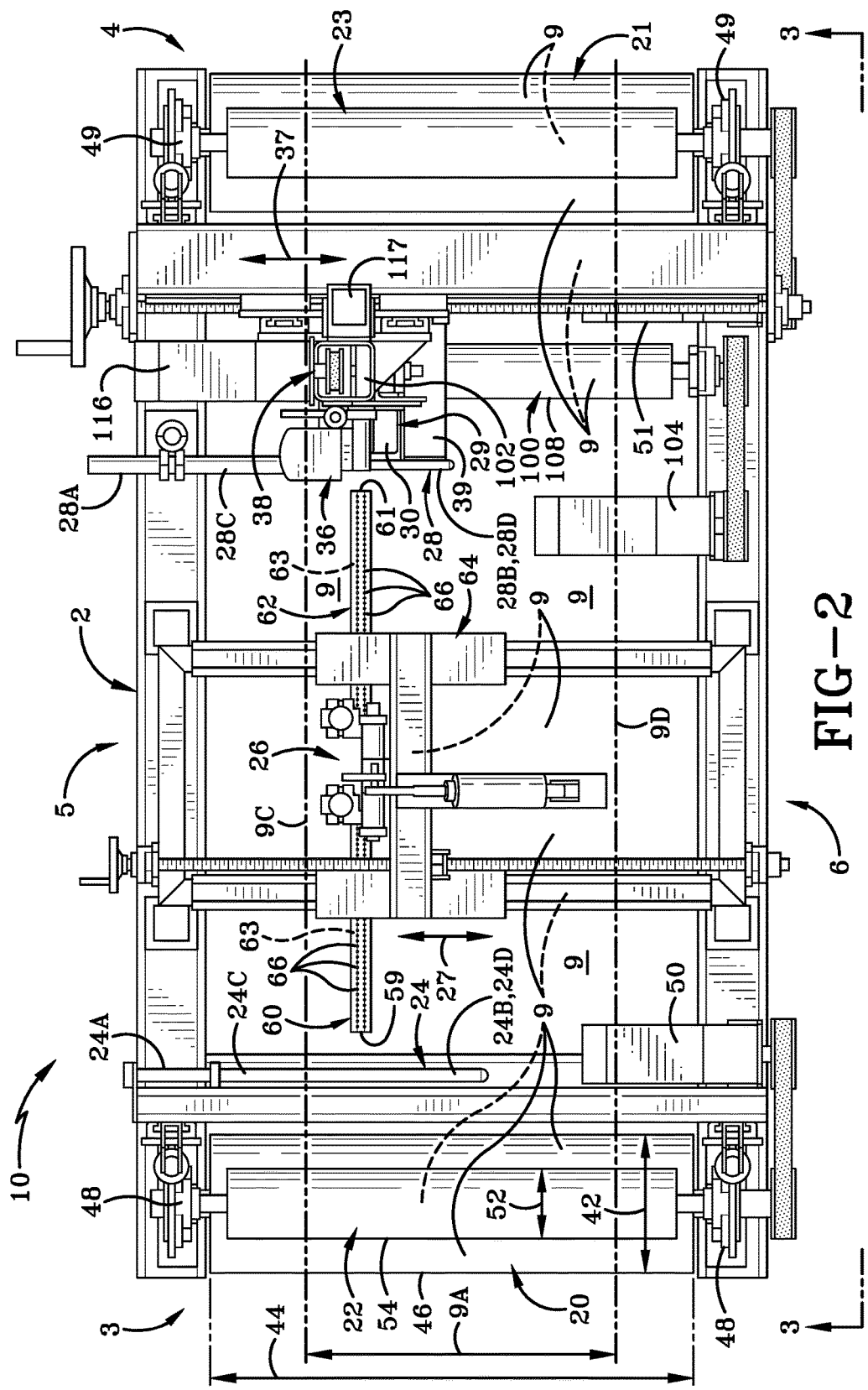
FIG. 2 is a top plan view of a sample embodiment the thermal back seam welder of the present invention taken along line 2-2 in FIG. 1.
Figure 3:
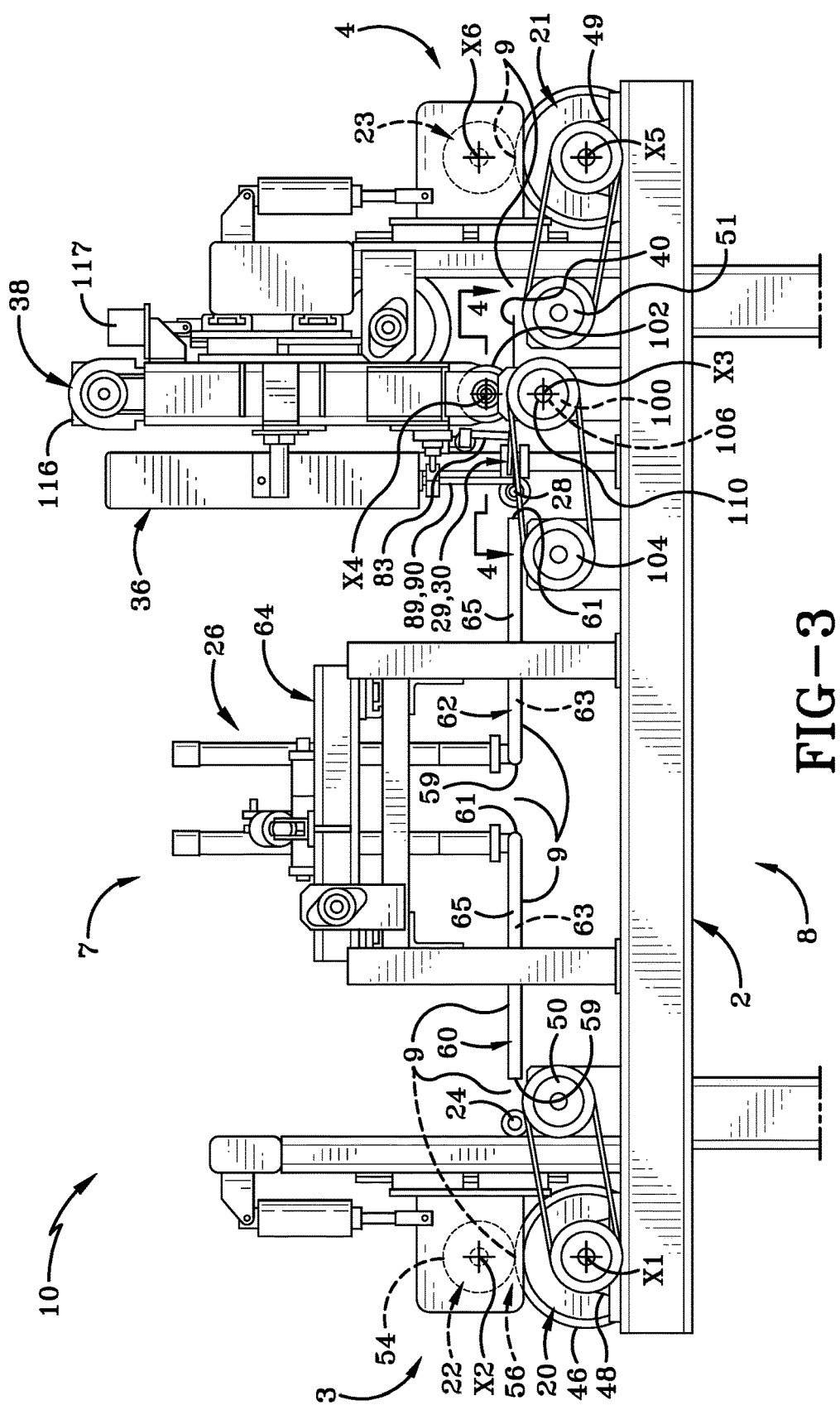
FIG. 3 is a side elevation view taken along line 3-3 in FIG. 2.

Referring primarily to FIGS. 2 and 3, thermal welding apparatus 10 has an upstream end 3 and a downstream end 4 defining therebetween a longitudinal direction, a left side 5 and a right side 6 defining therebetween an axial direction, a top 7 and a bottom 8. Welder 10 includes a rigid frame 2 extending from adjacent left side 5 to adjacent right side 6 and from adjacent upstream end 3 to adjacent downstream end 4, an upstream drive roller 20 adjacent upstream end 3, an upstream idle roller 22 adjacent upstream end 3 and roller 20, a downstream drive roller 21 adjacent downstream end 4, a downstream idle roller 23 adjacent downstream end 4 and roller 21, a rigid first sheet material separating shaft 24, a preheater assembly 26, a rigid second sheet material separating shaft 28, a heat or heater shield assembly 29 having a first or upper shield plate 30 and a second or lower shield plate 32 (FIG. 5) spaced apart and below first shield plate 30 wherein first and second shield plates 30 and 32 define therebetween a heater passage 34 (FIG. 5), a weld heater 36 a portion of which extends within passage 34, a compression mechanism 38 located closely adjacent and downstream of weld heater 36, and a rigid weld breaker assembly 39 comprising a rigid weld breaker 40 positioned downstream of the compression mechanism 38.

Figure 8:
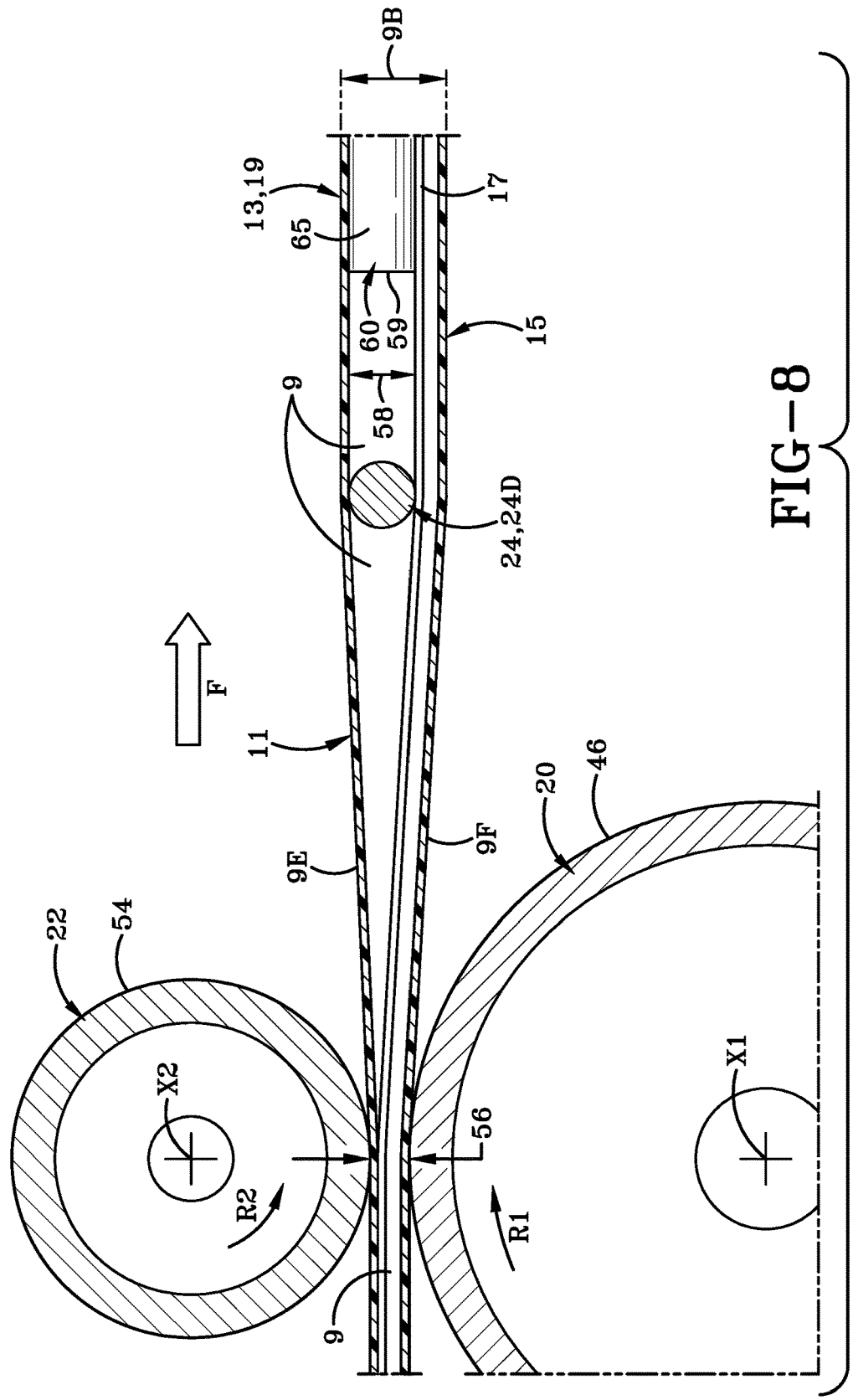
FIG. 8 is an enlarged cross section taken along line 8-8 in FIG. 7 showing the upstream drive roller, the upstream idle roller, a separation shaft, an upstream preheater manifold and the sheet material.

With primary reference to FIGS. 2 and 8, upstream drive roller 20 is positioned upstream of weld heater 36 and extends axially and generally orthogonally across or perpendicular to downstream direction or flow stream F of bag material 11. Upstream drive roller 20 is generally cannular in shape and has an axial length 44 greater than axial width 9A. Upstream drive roller 20 has a cylindrical outer surface 46 defining an outer diameter 42 (FIG. 2) of roller 20, which may be constructed of materials as one would understand in the art which are used to contact a flowing sheet of formed bag material. The top of outer surface 46 of upstream drive roller 20 defines a portion of lower boundary 9F of sheet material pathway 9. Roller 20 is rotationally secured by bearing 48 to frame 2. A drive mechanism 50 is operatively connected to roller 20 and may be a motor as conventionally known in the art configured to drive rotation of roller 20 about an axis X1 (FIG. 3) which is typically an axially extending axis which in the sample embodiment is substantially horizontal.

Upstream idle roller 22 is closely adjacent roller 20 and may be directly above roller 20. Roller 22 has a cylindrical outer surface 54 which defines an outer diameter 52 (FIG. 2) of roller 22 which is smaller than that of upstream drive roller 20. The bottom of outer surface 54 of idle roller 22 defines a portion of upper boundary 9E of sheet material pathway 9. The portions of outer surfaces 54 of roller 22 and 46 of roller 20 which are closest to one another are closely adjacent one another and define therebetween a portion of passage 56 (FIG. 8) of pathway 9. Idle roller 22 is rotationally connected 48 to frame 2, permitting roller 22 to rotate about axially extending axis X2, which is parallel to axis X1. Directly between axes X1 and X2, outer surfaces 46 and 54 may be in contact with or closely adjacent one another and may be spaced apart a distance approximately similar to the thickness of flowing sheet material 11. When moving downstream (Arrows F), material 11 passes through flow passage 56. Drive roller outer surface 54 and idle roller outer surface 46 contact material 11 as material 11 flows downstream through flow passage 56. While bag material 11 is flowing downstream, drive roller 20 rotates (Arrow R1 in FIG. 8) about axis X1 in the opposite direction of the rotation (Arrow R2 in FIG. 8) of idle drive roller 22. For example, when upstream drive roller 20 rotates in a clockwise manner, idle drive roller 22 rotates in a counter-clockwise manner. This permits material 11 to continuously flow F through flow passage 56.

Separating shaft 24 (FIGS. 2, 8) is adjacent and downstream of upstream rollers 20 and 22. Shaft 24 may be in the form or an axially elongated rod and may have a cylindrical outer surface defining an outer diameter of shaft 24 which may be in a range of about one-half or one inch to three or four inches in diameter, although other dimensions are contemplated. Shaft 24 has first and second (left and right) opposed ends 24A, 24B which are axially spaced from one another. Shaft 24 has a segment 24C including end 24A that is outside of sheet material pathway 9 and a segment 24D including end 24B that is inside sheet material pathway 9. Segment 24C extends axially from adjacent first end 24A to segment 24D, which extends from segment 24C to end 24B. Shaft 24 is rigidly secured at first end 24A in a cantilever fashion to frame 2 and extends axially to free or terminal second end 24B. First separating shaft 24 typically extends from adjacent left side 5 across and typically perpendicular to flow stream F partially across width 9A of sheet material pathway 9 so that internal segment 24D including terminal free end 24D is entirely within pathway 9. Shaft 24 is typically straight and horizontal from adjacent end 24A to adjacent end 24B.

With primary reference to FIGS. 2 and 3, preheater assembly 26 is adjacent and downstream of separation shaft 24. Preheater assembly 26 comprises a first or upstream manifold 60, a second or downstream manifold 62, a heat source (e.g., an electric heater), a blower and an axial adjusting carriage 64. A portion of heater assembly 26 extends within sheet material pathway 9. More particularly, each of manifolds 60 and 62 is within pathway 9. Manifolds 60, 62 are longitudinally elongated and typically are straight and horizontal from adjacent an respective upstream end 59 to adjacent a respective downstream end 61 of the given manifold. Upstream end 59 of manifold 60 and assembly 26 is adjacent and downstream of upstream rollers 20 and 22, and downstream end 61 of manifold 60 is distal and downstream of upstream rollers 20 and 22 and the upstream end 59 of manifold 60. The upstream end 59 of manifold 62 is adjacent and downstream of the downstream end 61 of manifold 60, and the downstream end 61 of manifold 62 of assembly 26 is distal the upstream end 59 of manifold 62 and adjacent and upstream of downstream separation shaft 28. Manifolds 60 and 62 are substantially parallel to one another and the flow stream direction F. Manifold 62 is typically directly downstream of manifold 60 such that the two manifolds are substantially collinear.

Figure 11:
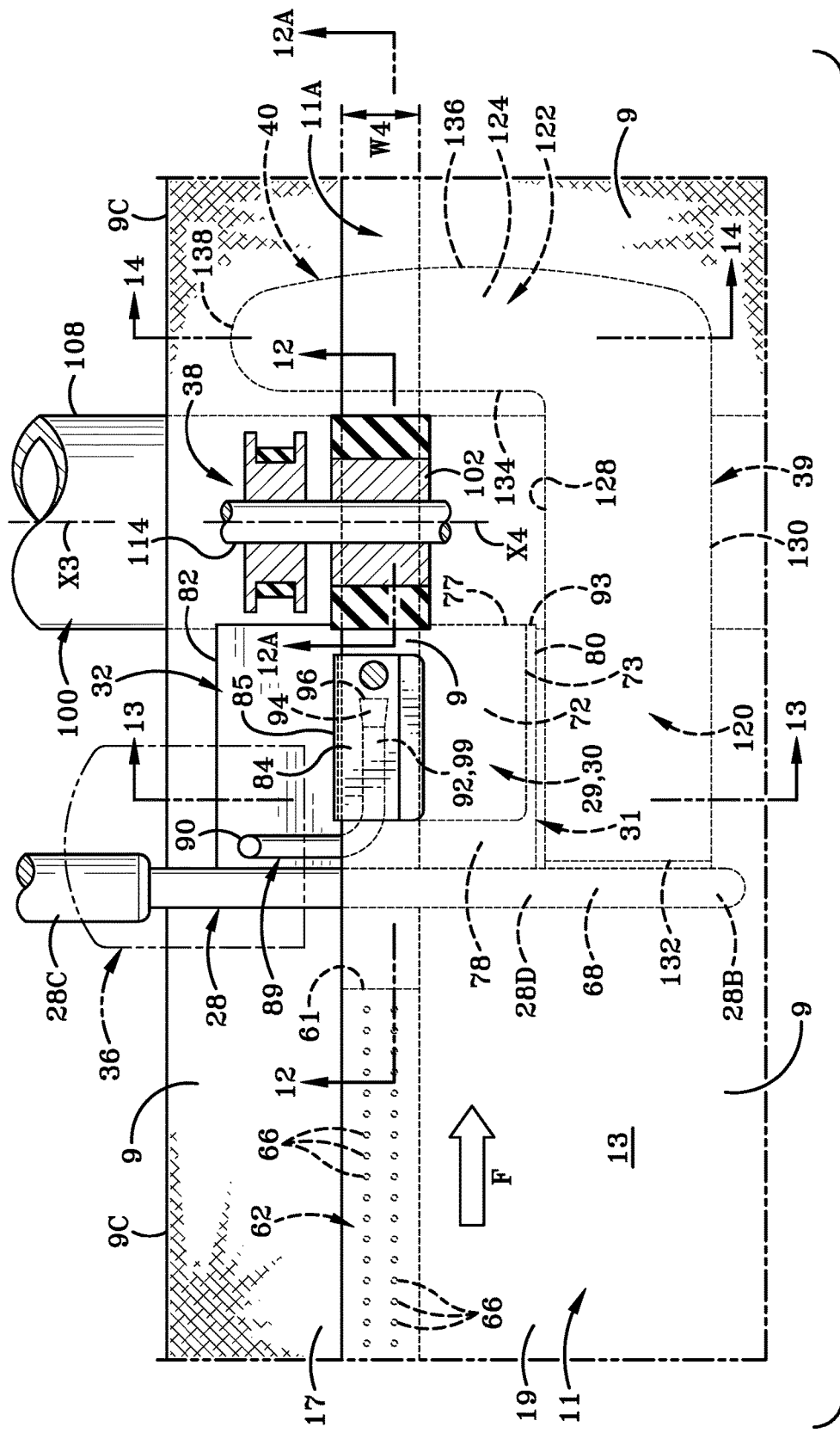
FIG. 11 is similar to FIG. 4 and shows the sheet material moving downstream past the preheating assembly, heater shield assembly, weld heater, weld rollers, and weld breaker.
Figure 12:
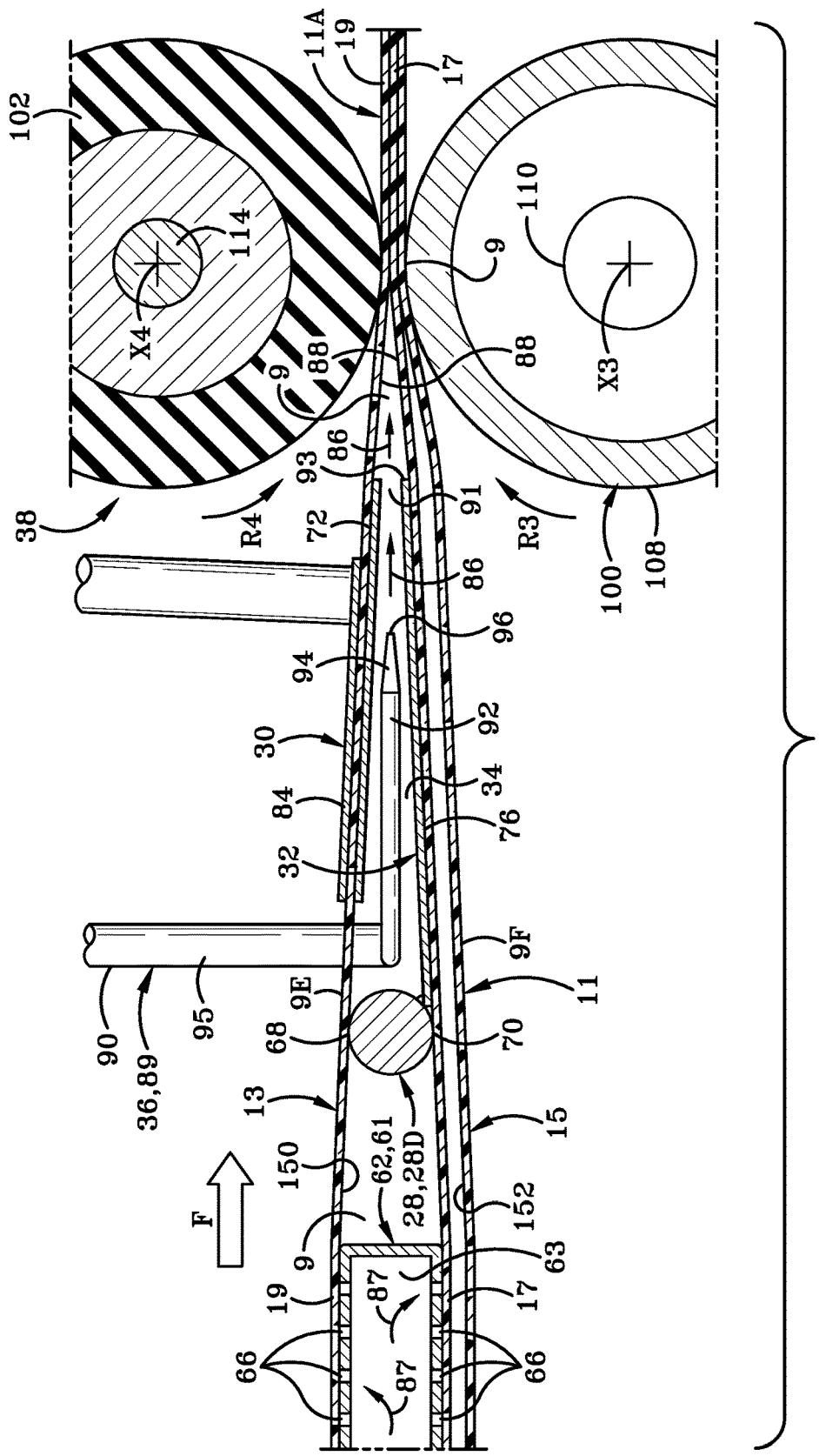
FIG. 12 is a side cross section view similar to FIG. 6 taken along line 12-12 in FIG. 11.

Each of manifolds 60 and 62 may have sidewalls 65 which define an interior chamber 63 extending from adjacent the upstream end to adjacent the downstream end of the respective manifold. Each manifold 60 and 62 may have formed in the sidewalls 65 thereof a plurality of apertures or holes which serve as air outlets 66 which extend from the respective interior chamber 63 to the outer surface of the respective sidewall 65 and thus to atmosphere external to the given manifold. Preheater assembly 26 further comprises a heater and a blower operatively connected to each other and in communication with the interior chamber of manifolds 60 and 62 whereby when the heater and blower are turned on/powered, the heater heats air which the blower blows to moved heated air into the interior chambers 63 of the manifolds and out of their respective air outlets 66. Preheater assembly 26 is axially adjustable via adjusting carriage 64 along directional arrow 27 (FIG. 2) to accommodate polywoven or other sheet material 11 of various sizes. Thus, preheater assembly 26 can be positioned axially at any desired location so that manifolds 60 and 62 are within any desired portion of pathway 9 to preheat longitudinally elongated portions of sheet material 11 used to form back seam 11A (FIGS. 11, 12).

With primary reference to FIGS. 2 and 4-6, second separation shaft 28 is adjacent and downstream of the downstream end 61 of manifold 62 and preheater assembly 26. Shaft 28 has first and second (left and right) opposed ends 28A and 28B which are axially spaced from one another such that shaft 28 is axially elongated therebetween. Downstream shaft 28 may be substantially straight and horizontal and parallel to upstream shaft 26. Shaft 28 is typically in the form of a rod which may have a cylindrical outer surface defining an outer diameter of shaft 28 of about ½ inch although other dimensions are contemplated. Shaft 28 has a top 68 and a bottom 70 each of which is on the cylindrical outer surface of shaft 28 where shaft 28 is configured in cylindrical form. Shaft 28 is rigidly secured at first end 28A in a cantilever fashion to frame 2 and extends axially to free or terminal second end 28B. Shaft 28 is thus secured along and extends from one side 5 of frame 2 toward the other side 6. Shafts 26 and 28 are thus secured along the same side of frame 2 and extend axially toward the opposite side. Shaft 28 extends part way but not all the way across the width of pathway 9. Shaft 28 extends across flow stream F typically perpendicular thereto and is partially within pathway 9. More particularly, shaft 28 has a segment 28C including end 28A that is outside of pathway 9 and a segment 28D including terminal end 28B that is inside pathway 9. Segment 28C extends axially from adjacent first end 28A to segment 28D, which extends from segment 28C to end 28B.

Figure 4:
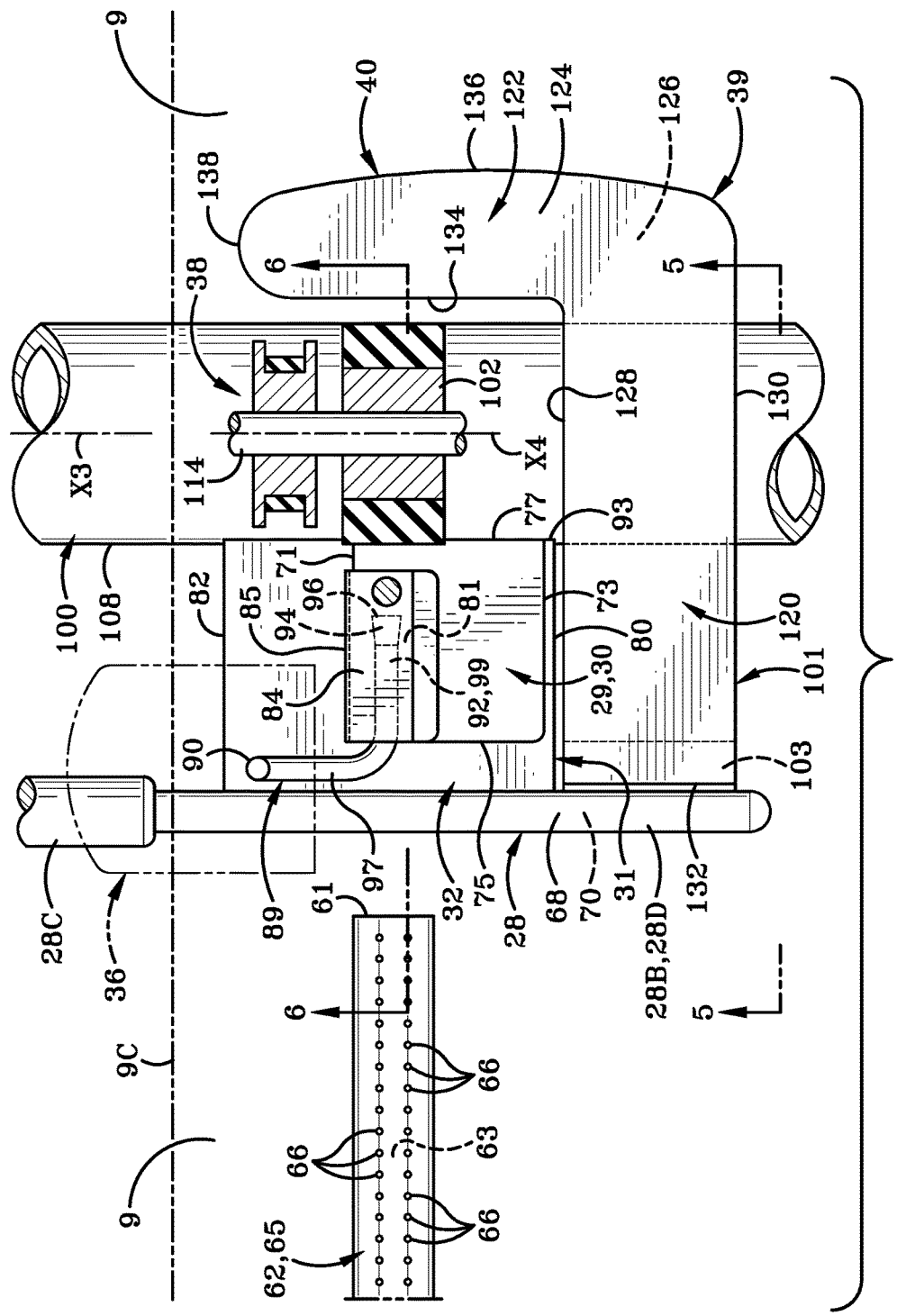
FIG. 4 is a an enlarged top plan view taken along line 4-4 in FIG. 3 showing a portion of the preheating manifold, the shield plates, the weld heater, the weld rollers, and the weld breaker.
Figure 5:
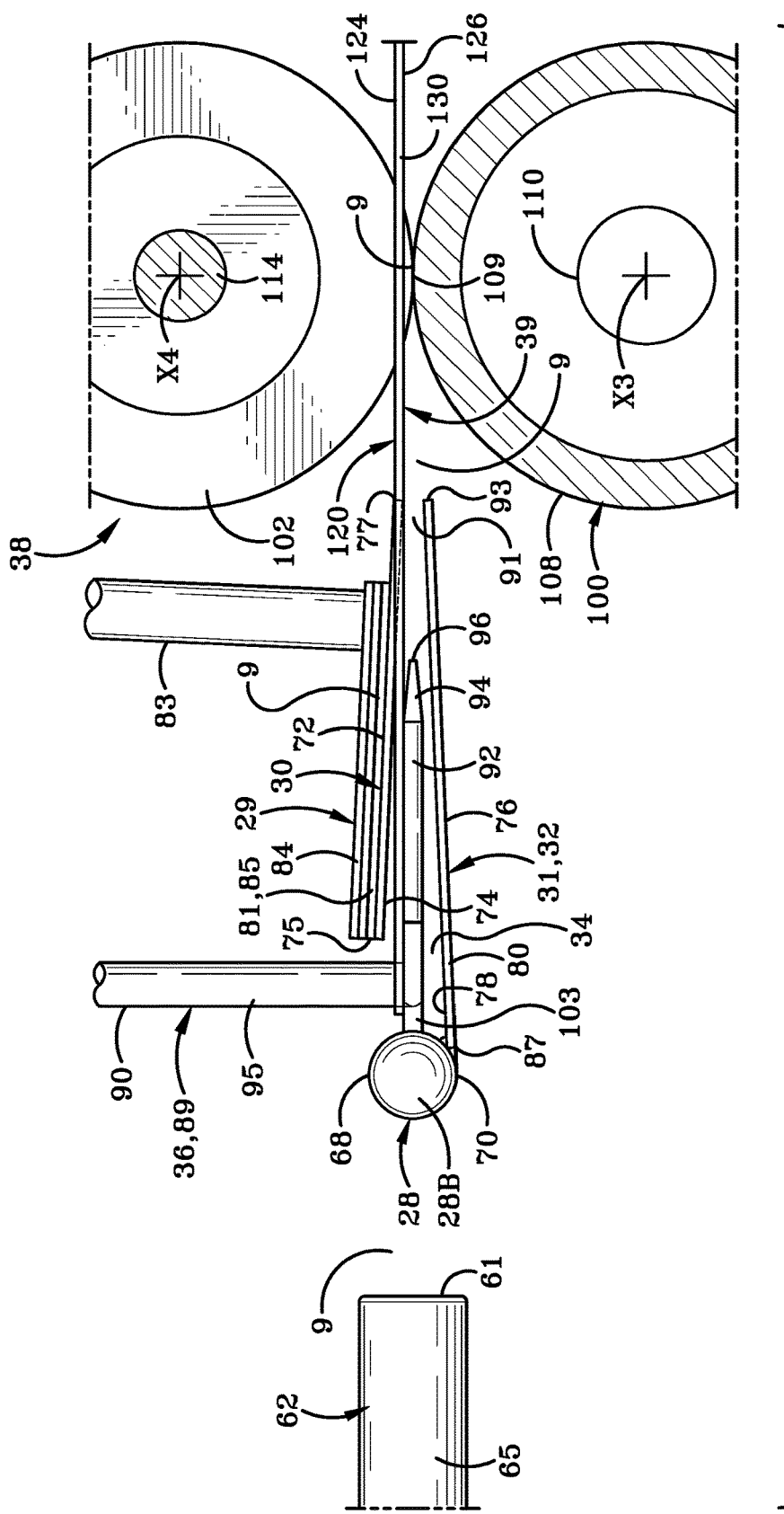
FIG. 5 is an enlarged section view taken along line 5-5 in FIG. 4.
Figure 6:
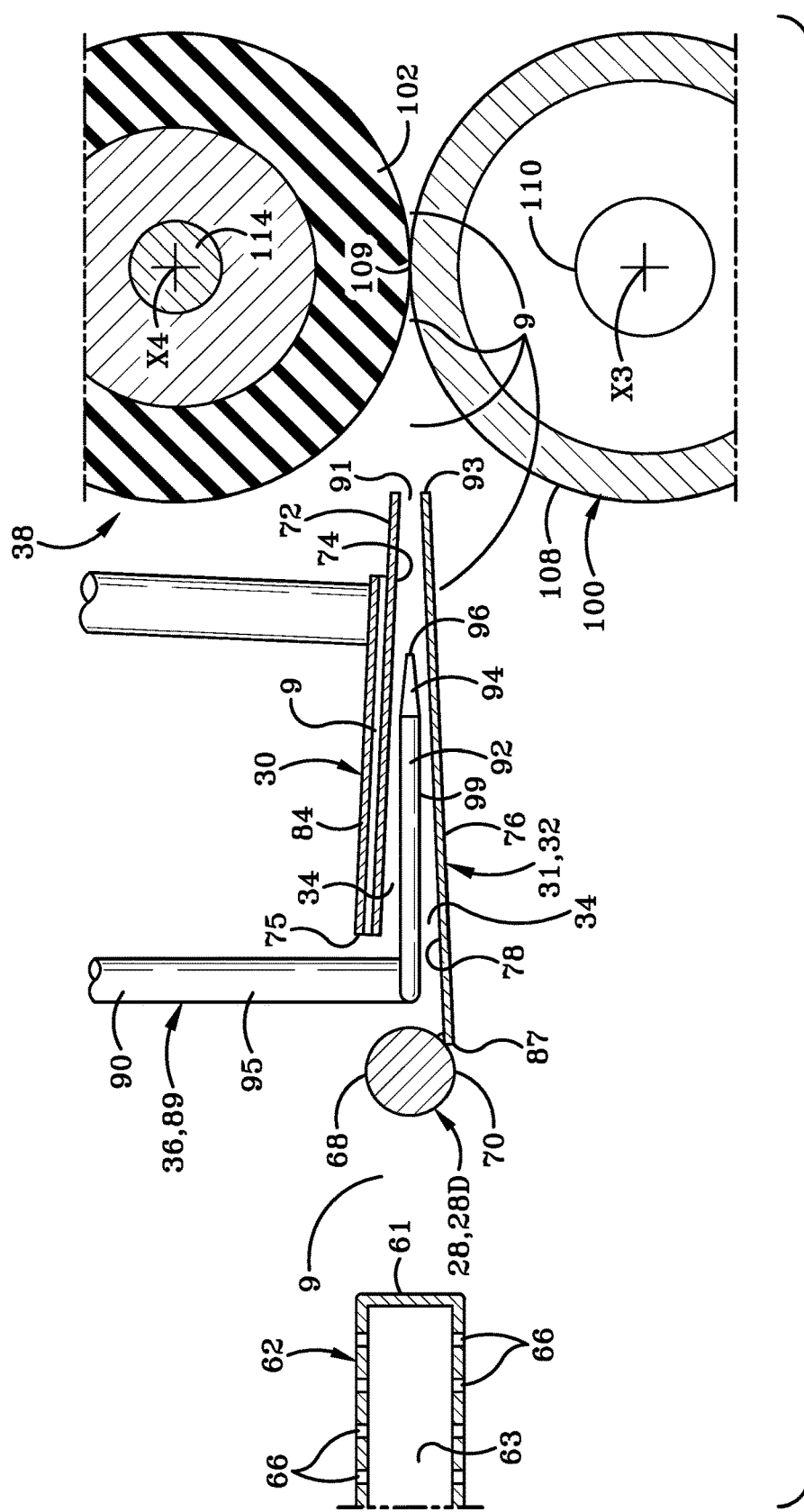
FIG. 6 is an enlarged section view taken along line 6-6 in FIG. 4.

With primary reference to FIGS. 4-6, heat shield or heater shield assembly 29 includes a plate assembly 31 and shaft 28. Plate assembly 31 includes first and second shield plates 30 and 32. First plates 30 is entirely within sheet material pathway 9. A portion of plate 32 is in pathway 9 and a portion of plate 32 is outside of pathway 9. A portion of segment 28D of shaft 28 directly upstream of plates 30 and 32 may be called a heat shield segment of shaft 28, such that a combination of the heat shield segment and plates 30 and 32 defines heater passage 34 in which a heating tip or welding tip of heater 36 is received. Plate assembly 31 may also include a plate or lip 84 which is substantially parallel to and directly above plate 30. Plate 30 and lip 84 are typically formed of a single piece of sheet metal which also includes a connecting wall or bend 85 which extends between and is rigidly secured to plate 30 and lip 84. Bend 85 is longitudinally elongated and extends upwardly from plate 30 a short distance so that lip 84 is adjacent and spaced upwardly of plate 30.

Plate 30 has an upwardly facing flat outer or top surface 72 and a downwardly facing flat inner or bottom surface 74 each of which extends from a first (left) longitudinally elongated side edge 71 to a second (right) longitudinally elongated side edge 73 of plate 30. Surfaces 72 and 74 also extend from an axially elongated upstream end or edge 75 to an axially elongated downstream end or edge 77 of plate 30. Bend 85 extends upwardly from side edge 71 to the left side edge of lip 84. Lip 84 has a downwardly facing flat bottom surface 79 which is adjacent and spaced upwardly of top surface 72 of plate 30 so that bottom surface 79 and top surface 72 define therebetween a sheet-edge receiving space or guide passage 81 having an upstream entrance opening, a downstream exit opening and a (right) side entrance opening. Passage 81 is closed on its left side by connecting wall or bend 85. Passage 81 is a small portion of pathway 9. In the sample embodiment, lip 84 extends axially only part of the way across plate 30 although this may vary. The upper portion (plates 30 and 84 and bend 85) of plate assembly 31 are secured to frame 2 by a rigid plate mounting leg or rod 83 which may extend upwardly from the upper portion of assembly 31 perpendicular to flat plates 30 and 84. A first or upper end of rod 83 is rigidly secured to frame 2 and extends downwardly therefrom in a cantilever fashion to a second or bottom opposed free or terminal end which is rigidly secured to the upwardly facing top surface of plate 84. In the sample embodiment, the rigid connection between plate 84 and the bottom of rod 83 is the only connection between the upper portion of plate assembly 31 and the rest of welder 10, such that said upper portion is suspended at the bottom end of rod 83 and out of contact with any other portion of welder 10.

Plate 30 is generally adjacent and downstream of segment 28D of shaft 28 and generally adjacent and upstream of a pair of pinch rollers of compression mechanism 38. Upstream end 75 is adjacent and downstream of segment 28D and at about the same height as top 68 of shaft segment 28D. Downstream end 77 is adjacent and upstream of the pinch rollers of compression mechanism 38. Plate 30 extends downstream from adjacent segment 28D toward compression mechanism 38 and may angle downwardly relative to horizontal and towards lower plate 32 in the downstream direction so that downstream end or edge 77 may be a little lower than upstream end or edge 75.

With continued primary reference to FIGS. 4-6, lower plate 32 extends directly below upper or intermediate plate 30 and top plate 84. Plate 32 has a downwardly facing flat outer or bottom surface 76 and an upwardly facing flat inner or top surface 78 which faces, is adjacent and is spaced downwardly from bottom surface 74 of plate 30. The welding tip of heater 36 is between plates 30 and 32 and adjacent inner surfaces 74 and 78. Plate 32 has first (left) and second (right) longitudinally elongated opposed side edges 82 and 80. Plate 32 has an axially elongated upstream end or edge 87 and an axially elongated downstream end or edge 93. Plate 32 is rigidly secured along upstream edge 87 to shaft 28 adjacent bottom 70 and extends downstream therefrom in cantilever fashion to free or terminal downstream edge 93. Downstream end 93 is adjacent and upstream of the pinch rollers of compression mechanism 38. End or edge 93 is adjacent and spaced directly below downstream edge 77 of upper plate 30 so that edges 93 and 77 define therebetween a downstream exit opening 91 of heater passage 34.

Plate 32 extends downstream from adjacent bottom 70 of rod 28 toward compression mechanism 38 and may angle slightly upwardly relative to horizontal and towards first plate 30. Thus, the upstream end (adjacent edge 75 of plate 30) of passage 34 may be vertically wider than the downstream end of passage 34 adjacent edges 77 and 93. Passage 34 may thus narrow in the downstream direction. Plates 30, 32 and 84 are typically formed of a sheet metal or another material which may be capable of withstanding temperatures at least 1450° F. or more while maintaining the structural integrity of the plates and/or without melting.

Weld heater 36 includes a heat source (e.g. an electric heater) and a blower in fluid communication with the heat source and an air source. Weld heater 36 may be axially adjustable as show by arrow 37 in FIG. 2. Heater 36 has an air tube 89 defining a hot air passage which extends along the entire length of tube 89, an upper inlet end 90 defining an air inlet, and a lower front outlet end 92 having a nozzle 94 defining an air outlet 96. The air inlet of inlet end 90 is in fluid communication with the blower of heater 36 so that blower 36 when turned on blows heated air (heated by the heat source of heater 36) through the hot air passage of tube 89 from the inlet end 90 to the outlet end 92 and out of exit opening 96. Tube 89 includes a first or upwardly extending or vertical leg 95, a second or axial leg 97 which is secured to the bottom end of leg 95 and extends axially therefrom (to the right) to a distal (right) end distal the bottom of leg 95, and a third or longitudinal leg 99 which is secured to the distal end of leg 97 and extends longitudinally downstream to a downstream end which defines exit opening 96. Leg 99 serves as a welding tip of heater 36 which includes exit opening 96 and is within heater passage 34 with exit opening 96 upstream of, adjacent and facing downstream toward exit opening 93 of passage 34. Exit opening is thus in fluid communication with heater passage 34.

Exit opening 96 of nozzle 94 and exit opening 93 of passage 34 permits hot air 86 (Arrows 86 in FIG. 12) to exit nozzle 94 and passage 34 into space immediately downstream of exit opening 34 and upstream of the pinch rollers of compression mechanism 38. Exit opening 96 has an axial width typically in a range of about one-half or one inch to about three or four inches although this may vary. An axial width of about one inch is suitable in many cases. Exit opening 96 typically has an axial width sufficient to ensure that the entire axial width of weld surfaces 88 (FIG. 12) is heated by hot air blown out of exit openings 96 and 93. Weld heater 36 and its components are typically constructed of materials such as metal that can easily withstand high temperatures while resisting deformation.

Compression mechanism 38 comprises a set of pinch rollers 100 and 102 to compress the portions of sheet material 11 heated by heater 36 to weld the back seam. Roller 100 is rotatably mounted on frame 2 via an axle 110 to rotate about an axis X3 which extends axially and is horizontal in the sample embodiment. Roller 102 is rotatably mounted on frame 2 about an axle 114 to rotate about an axis X4 which is parallel, adjacent and offset from axis X3. Axes X3 and X4 are typically parallel to axes X1 and X2. Roller 102 is a driven roller such that a drive mechanism is operatively connected to and drives rotation of roller 102.

For instance, rotation of roller 100 may be driven by a conventional mechanical drive assembly 104 such as a chain and sprocket or belt and pulley. However, any suitable drive mechanism may be used.

Rollers 100, 102 are positioned closely adjacent and downstream of downstream end 94, exit opening 96, downstream edge 77 and 93 and exit opening 93. Each of rollers 100 and 102 has a cylindrical outer surface. Portions of each of these cylindrical surface bounds or defines therebetween a short portion 109 of pathway 9 which serves as a compression passage through which sheet material 11 passes and in which material 11 is compressed. In the sample embodiment, the top of the cylindrical outer surface of roller 100 and the bottom of the cylindrical outer surface of roller 102 are closely adjacent one another and define therebetween this short portion of pathway 9, and when no sheet material is between rollers 100 and 102, this top and bottom of said cylindrical outer surfaces may be in contact with one another. These cylindrical outer surfaces may be formed of metal, a polymeric or plastic material, or any suitable material capable of withstanding the operational temperatures created downstream of welding tip 99 of heater 36. Compression mechanism 38 also includes a compression controller 117 (FIGS. 2-3) which may include pneumatic or hydraulic actuators positioned and operatively connected to rollers 100 and 102 to press at least one of rollers 100 and 102 toward the other of rollers 100 and 102. Controller 117 controls the amount of force applied to achieve this pressing of one or both rollers. While rollers 100 and 102 are typically used to provide compression of sheet material 11, other known compression devices may be used, such as pinch belts. For example, a set of pinch belts is disclosed in U.S. Patent Application Publication No. 2012/0227363.

With primary reference to FIGS. 4 and 5, weld breaker assembly 39 is described. Assembly 39 includes leg or shaft 28 and a rigid flat plate 101 which is L-shaped as viewed from above and typically horizontal. Thus, heat shield assembly 29 and weld breaker assembly 39 share a common leg, shaft or rod 28. Plate 101 is typically formed of a piece of sheet metal. L-shaped plate 101 is rigidly secured to and extends horizontally downstream from shaft 28 in a cantilever fashion to a free or terminal downstream end or edge of plate 101. Plate 101 may be secured to shaft 28 by a rigid mounting flange 103 which is rigidly secured to and extends downstream from shaft 28 a short distance. Flange 103 is shown as a flat horizontal plate which is vertically thicker than plate 101. Plate 101 is rigidly secured to flange 103 and extends downstream therefrom in cantilever fashion.

Plate 101 includes a longitudinally elongated leg 120 and an axially elongated leg 122 and has a flat upwardly facing first or top surface 124 and a parallel flat downwardly facing second or bottom surface 126 which faces away from surface 124. Surfaces 124 and 126 may be horizontal. Leg 120 of plate 101 has two longitudinally elongated opposed edges 128 and 130 and an upstream axially elongated edge 132 from which edges 128 and 130 extend downstream horizontally and perpendicular to shaft 28 and edge 132 to an axially elongated downstream end or edge 136 of longitudinal leg 120 and plate 101. Edge 136 also serves as downstream end or edge of axial leg 122, which has an axially elongated upstream end or edge 134. Edge 134 is substantially perpendicular to edges 128 and 130 and substantially parallel to shaft 128. Edge 136 is shown as a shallowly curved edge which is generally perpendicular to edges 128 and 130 and generally parallel to shaft 128 and edge 134. Leg 122 has a free or terminal arcuate end edge 138 which transitions from the left end of edge 134 to the left end of edge 136. Edges 128-138 define the L-shape of plate 101. Surfaces 124 and 126 are typically generally flat and substantially continuous between all edges 128-130. Edges 128 and 130 are substantially parallel to the downstream direction (Arrows F) at the portion of pathway 9 in which edges 128 and 130 are disposed. Edges 132, 134 and 136 are substantially perpendicular to the downstream direction at the portion of pathway 9 in which edges 132, 134 and 136 are disposed.

Weld breaker 40 is a portion of axial leg 122 which is adjacent and directly downstream of compression passage 109 defined between pinch rollers 100 and 102. (Where pinch belts are used instead of pinch rollers, weld breaker 40 is adjacent and directly downstream of an analogous compression passage defined between the pinch belts.) Weld breaker 40 is adjacent and downstream of rollers 100 and 102 (or pinch belts where used) of compression mechanism 38. Edge 134 of breaker 40 is straight in the exemplary embodiment and serves as a breaker surface or breaker edge for breaking incidental welds as discussed further below. L-shaped plate 101 is entirely within pathway 9, and thus each component thereof, including legs 120 and 122 and weld breaker 40 are entirely within pathway 9. Leg 120 is adjacent and axially offset (here, to the right) or spaced from heat shield assembly 29 (plates 30, 32 and 84), passage 34, pinch rollers 100 and 102, compression passage 109 and welding tip 99. Leg 122 extends to the left beyond the left sides of pinch rollers 100 and 102 and passage 109 and extends to the right beyond the right sides of pinch rollers 100 and 102 and passage 109.

Downstream drive roller 21 is downstream of the weld breaker 40. Roller 21 is axially elongated and extends outwardly beyond pathway 9 to the left and right. Roller 21 has a cylindrical outer surface and may be constructed of materials similar to the upstream drive roller 20. Upstream drive roller 20 is rotatably mounted such as by a bearing 49 to the frame of welder 10. A drive mechanism 51 is operatively connected to the roller 21. Drive mechanism 51 may be a motor configured to rotate roller 21 about an axis X5 which is parallel to axes X1-X4. Downstream idle roller 23 is adjacent and directly above roller 21. The cylindrical outer surface of roller 23 may have a diameter smaller than roller 21. Roller 23 is rotatably mounted to the frame of welder 10 so as to be rotatable about an axis X6 which is parallel to axes X1-X5. The cylindrical outer surfaces of rollers 21 and 23 define therebetween a passage or portion of pathway 9.

The operation of welder 10 will be described after a brief description of the formation of sheet material into a tubular configuration. Sheet material 11 is typically unwound from a bulk sheet material roll 12 (FIG. 1) upstream of components 14 and moves downstream therefrom through a bag former or tuber of components 14 (FIG. 1). The bag former or tuber of 14 forms sheet material 11 into a tubular configuration having a first or bottom panel 15 and a second or top panel 13. Panels 13 and 15 are superimposed. Panel 13 includes a first segment 17 and a second segment 19 which overlap one another in an unwelded overlap region 140 which welder 10 subsequently forms into a welded back seam 11A (FIGS. 7, 11, 12, 14) as sheet material 11 moves downstream within pathway 9. As shown in FIG. 9, each of panels 13 and 15 has a width W1, left panel segment 17 has a width W2, right panel segment 19 has a width W3, and overlap region 140 and back seam 11A have a width W4. Width W1 is the normal axial distance from side edge 9C to side edge 9D. Width W2 is the normal axial distance from side edge 9C to a terminal longitudinal edge 142 of panel segment 17. Width W3 is the normal axial distance from side edge 9D to a terminal longitudinal edge 144 of panel segment 19. Width W4 is the normal axial distance from edge 142 of panel segment 17 to edge 144 of panel segment 19. The sheet material 11 which is formed into the tubular configuration by tuber 14 may or may not have pleated edges or additional folds along the edges 9C and 9D. The formed material leaves the bag former and flows downstream in its formed but unwelded state. Welder 10 forms the welded back seam 11A as sheet material move downstream through pathway 9. Thereafter, welded sheet material 11 with back seam 11A may move further downstream from welder 10 to the downstream components 16 where additional functions are performed to create additional seams such as a bottom seam and possibly a top seam.

Figure 7:
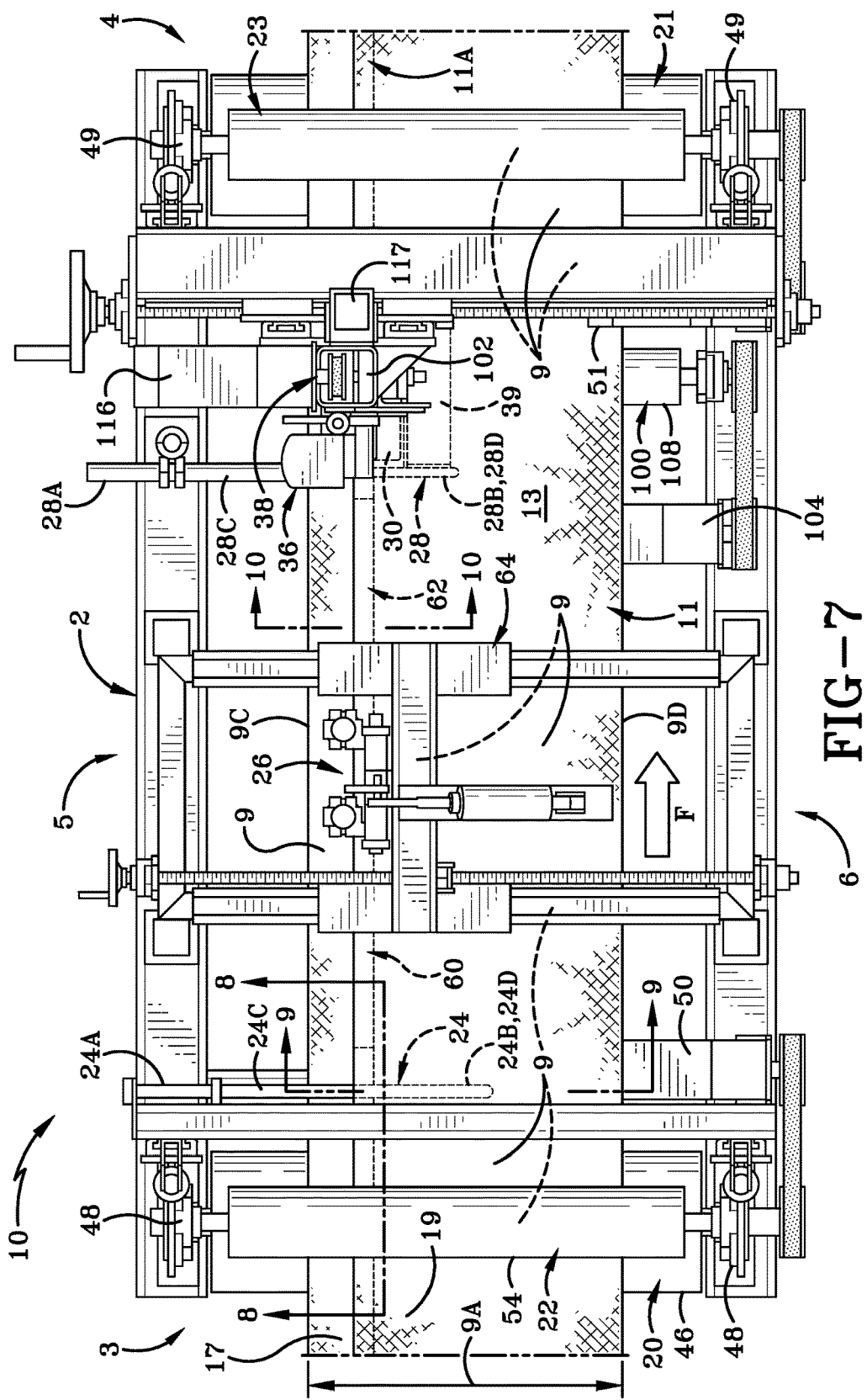
FIG. 7 is a top plan view similar to FIG. 2 showing sheet material moving downstream.

The operation of welder 10 is shown with primary reference to FIGS. 7-14. Reference herein to downstream movement of sheet material 11 as it passes through welder 10 means downstream movement of sheet material within pathway 9. The sheet material 11 in the tubular configuration created by the tuber 14 (FIG. 1) material moves into welder 10 at its upstream end in sheet material pathway 9, passing through passage 56 between rollers 20 and 22, as shown in FIGS. 7 and 8. Sheet material 11 remains in this generally flat tubular configuration as it moves downstream through welder 10, first without seam 11A upstream of compression mechanism 38 and subsequently with seam 11A downstream of compression mechanism 38. Controls of welder 10 control the rotation of drive rollers 20 and 21 to facilitate downstream movement of material 11 at an appropriate flow rate. After sheet material passes through passage 56, panel segments 17 and 19 are separated from one another by separation shaft 24 adjacent and downstream of the rollers 20, 22. Shaft 24 thus extends between segments 17 and 19 and separates overlapping weld surfaces 88 of segments 17 and 19 in the overlap region 140 while segments 17 and 19 slidably engage opposite sides of shaft 28 as sheet material 11 continues moving downstream. One of segments 17 and 19 (here 19) is directly above and closely adjacent or in contact with shaft 24 and the other of segments 17 and 19 (here 17) is directly below and closely adjacent or in contact with shaft 24. Shaft 24 creates a gap 58 (FIG. 8) within pathway 9 between weld surfaces 88 of panel segments 17 and 19. During downstream movement of sheet material 11, a portion of segment 24D is directly between panels 17 and 19 in overlap region 140, and a portion of segment 24D is directly between panels 19 and 15 axially offset from overlap region 140 (and thus not directly between panels 17 and 19).

Segments 17 and 19 and weld surfaces 88 continue to move downstream in a bifurcated or spaced apart manner (by gap 58) towards and along manifolds 60 and 62 of preheater assembly 26. Each of manifolds 60 and 62 is in gap 58. During downstream movement of sheet material 11, each of manifolds 60 and 62 are directly between panels 17 and 19 in overlap region 140 and directly between panels 15 and 19 in overlap region 140. As sheet material moves downstream along and past manifolds 60 and 62, panels 17 and 19 are closely adjacent or in contact with opposite sides of each of the manifolds, and may slidably engage these opposite sides or surfaces of the manifolds. Manifolds are heated in accordance with suitable controls of welder 10 and in turn provide heat to heat weld surfaces 88 of panels 17 and 19 as sheet material 11 moves downstream past the manifolds. In the exemplary embodiment, the blower of the preheater assembly blows or forces heated air through the manifold interior chambers and out of holes 66 directly onto surfaces 88 to preheat surfaces 88. The preheater simultaneous preheats both of weld surfaces 88 as sheet material passes or moves downstream adjacent manifolds 60 and 62. Although hot or heated air 87 (FIG. 10) may be used to heat weld surfaces 88, other heaters may be used. Hot air 87 may be approximately between 100° C. and 800° C. depending of the specific sheet material used and the downstream flow rate of the sheet material. (In one example, when the material flow stream is advancing at a downstream flow rate of approximately 120 M/min, the temperature of the hot air 87 flowing through the preheater assembly 26 may be approximately between about 300° C. and about 400° C.) Generally, hot air 87 is usually within a range of about 100° F. to about 1450° F. Controls of welder 10 control the temperature setting as needed.

As shown in FIGS. 11 and 12, sheet material in the tubular configuration moves downstream from preheater 26 around and past shaft 28 such that the heated and bifurcated weld surfaces 88 are closely adjacent or in contact with shaft 28, whereby surfaces 88 of panels 17 and 19 may slidably engage opposite sides of shaft 28 during the downstream movement, such as the top and bottom sides or surfaces 68, 70. Shaft 28 keeps weld surfaces 88 separate prior to compression between the pinch rollers of compression mechanism 38. Immediately after moving past shaft 28, sheet material 11 continues moving downstream past plates 30, 32 and 84 and pinch roller 100 and 102 of compression mechanism 38. As sheet material 11 moves downstream past plates 30, 32 and 84, the sheet edge or portion of segment 19 in overlap region 140 (including weld surface 88 of segment 19) passes through passage 81. Weld surface 88 of panel segment 19 is closely adjacent or in contact with surface 72 of plate 30 as panel segment 19 moves downstream past plate 30, whereby surface 88 of panel segment 19 may slidably engage surface 72 during downstream movement of sheet material 11. The surface of panel segment 19 which faces opposite weld surface 88 of panel 19 is closely adjacent or in contact with surface 79 of plate 84 as panel 19 moves downstream past plates 30 and 84, whereby said opposite surface of panel 19 may slidably engage surface 79 during downstream movement of sheet material 11. Weld surface 88 of panel segment 17 is closely adjacent or in contact with surface 76 of plate 32 as panel segment 17 moves downstream past plate 32, whereby surface 88 of panel segment 17 may slidably engage surface 76 during downstream movement of sheet material 11. Edge 144 is also closely adjacent or in contact with surface bend or connecting wall 85 segment 19 moves downstream past plates 30, 32, 84 and wall 85, whereby edge 144 of segment 19 may slidably engage wall 85 during downstream movement of sheet material 11.

As sheet material 11 moves downstream from shaft 28 toward passage 109 between pinch rollers 100, 102, the portions of segments 17 and 19 within overlap region 140, including weld surfaces 88, move closer to one another until surfaces 88 are forced into contact with one another by the force which forces or compresses at least one of rollers 100, 102 toward the other of rollers 100, 102. These portions of segments 17 and 19 thus taper toward one another along in a manner analogous to the tapering of plates 30 and 32 toward one another. As these portions of segments 17 and 19 are moving downstream along plates 30 and 32, weld heater 36 is heated within heater passage 34 to further heat weld surfaces 88 to increase their temperature beyond that produced by preheater assembly 26 to a welding temperature which allows them to be thermally welded to one another when compressed together by compression mechanism 38.

In the exemplary embodiment, as overlap region 140 moves downstream beyond the tapered plates 30, 32, the blower of heater 36 blows hot air 86 (FIG. 12) onto weld surfaces 88 to the desired welding temperature as region 140/surfaces 88 pass between roller 100 and 102 in passage 109. More particularly, hot air 86 is blown through heater 36 through inlet end 90 to outlet end 92 out of exit opening 96 of nozzle 94 into the downstream portion of passage 34 and out of exit opening 93 between segments 17 and 19 of overlap region 140 directly onto weld surfaces 88 to heat surfaces 88 to the desired welding temperature. Exit opening 96 is adjacent the portions of weld surfaces 88 being heated by hot air 86, typically an inch or less upstream of said portions of the weld surfaces 88.

Weld heater 36 raises the temperature of weld surfaces 88 to allow the material 11 forming surfaces 88 to weld to one another upon passing through compression mechanism 38 and cooling sufficiently. Typically, heater 36 heats weld surfaces 88 to a welding temperature which melts surfaces 88, which are then pressed together by rollers 100, 102 and cooled to form welded back seam 11A. Generally, the applied amount of heat from weld heater 36 is in a range of about 100° F. to about 1450° F., although this may vary depending on the specific material 11 and the flow rate at which the material 11 is moving downstream. Controls of welder 10 control the temperature setting as needed.

Sheet material 11 continues moving downstream past the welding tip of heater 36 and the downstream ends of plates 30 and 32 to pass between rollers 100 and 102. As material 11 moves downstream between roller 100 and 102, roller 100 rotates (Arrow R3 in FIG. 12) about axis X3 and roller 102 rotates (Arrow R4 in FIG. 12) about parallel axis X4 in a direction opposite that of roller 100. As sheet material moves downstream between rollers 100, 102, cylindrical outer surface 108 of roller 100 rollingly contacts the outer or bottom surface of bottom panel 15 directly below overlap region 140 while the cylindrical outer surface of roller 102 rollingly contacts the outer or top surface of segment 19 of top panel 13. Under the control of appropriate controls of welder 10, hydraulic, pneumatic or other actuators of compression mechanism 38 are actuated to apply pressure of rollers 100 and 102 toward one another. Rollers 100 and 102 thus press or force panels 13 and 15 against one another in overlap region 140, specifically so that segments 17 and 19 in overlap region 140 are pressed or forced against one another and so that segment 17 in overlap region 140 and the portion of panel 15 immediately adjacent region 140 are pressed or forced against one another. Inasmuch as heater 36 applies heat to region 140 immediately upstream of roller 100 and 102, sufficient heat may be applied to segment 17 in region 140 and/or to panel 15 immediately adjacent region 140 to cause undesired incidental welds 146 (FIG. 12A) to form between segment 17 in region 140 and panel 15 immediately adjacent region 140. These incidental welds 146 thus may also be said to extend between back seam 11A and panel 15.

As shown in FIG. 12A, weld breaker 40 is positioned to break and thereby eliminate these undesired incidental welds 146, thereby leaving behind broken welds 146A between back seam 11A and panel 15, or between segment 17 in region 140 and panel 15 immediately adjacent/opposite region 140. More particularly, sheet material 11 continues moving downstream beyond the pinch rollers of compression mechanism 38 so that back seam 11A and panel 15 immediately adjacent seam 11A moves past weld breaker 40, thereby breaking any incidental welds 146 that had formed between seam 11A and panel 15. In the exemplary embodiment, back seam 11A travels downstream directly over breaker 40 of axial leg 122 while the portion of panel 15 adjacent region 140 and seam 11A travels downstream directly under breaker 40. Breaker edge 134 breaks welds 146 as sheet material 11 moves downstream relative to the stationary breaker 40, thus leaving seam 11A intact and eliminating welds 146 to leave behind broken welds 146A. As material 11 moves downstream, the inner surface of seam 11A is closely adjacent or in contact with top surface 124 of breaker 40 and may thus slidably engage surface 124. Likewise, the inner surface of panel 15 is closely adjacent or in contact with bottom surface 126 of breaker 40 and may thus slidably engage surface 126 during downstream movement of sheet material 11.

Broken welds 146A extend inwardly respectively from the inner surface of seam 11A (or inner surface of panel 17 in region 140) and the inner surface of the portion of panel 15 in region 140. The broken welds 146A which extend inwardly (here downwardly) from the inner surface of seam 11A (or inner surface of panel 17 in region 140) thus extend inwardly toward the broken welds 146A which extend inwardly (here upwardly) from the inner surface of the portion of panel 15 in region 140. Broken welds 146A are formed of or from sheet material 11 and are thus the same material as that making up panels 13 and 15 and any gusset panels where gussets are included in forming the sheet material tube having seam 11A. More particularly, incident welds 146 are formed by melting and subsequent solidification of material 11 of panel 17 in overlap region 140, whereby the solidified material 11 of welds 146 when broken by breaker 40 makes up welds 146A.

As sheet material is moving downstream and welds 146 are being broken, breaker 40 is also forcing the separation of seam 11A and the portion of panel 15 in region 140 from one another to form therebetween a space 150 which is part of the interior chamber defined between panels 13 and 15 of the newly seamed tube of sheet material 11. Space 150 is between the inner surface of seam 11A (or inner surface of panel 17 in region 140) and the inner surface of the portion of panel 15 in region 140. Space 150 is thus also between the broken welds 146A which extend inwardly (here downwardly) from the inner surface of seam 11A (or inner surface of panel 17 in region 140) and the broken welds 146A which extend inwardly (here upwardly) from the inner surface of the portion of panel 15 in region 140. During downstream movement of sheet material 11, breaker 40 is directly between the inner surface of seam 11A (or inner surface of panel 17 in region 140) and the inner surface of the portion of panel 15 in region 140.

During downstream movement of sheet material 11, breaker 40 is directly between the inner surface of seam 11A (or inner surface of panel 17 in region 140) and the inner surface of the portion of panel 15 in region 140; a portion of segment 28D, leg 120 and a portion of leg 122 (between leg 120 and breaker 140) is directly between panels 19 and 15 axially offset from seam 11A or region 140 on one side of seam 11A or overlap region 140 (and thus not directly between panels 17 and 19); a portion of leg 122 (including end edge 138) is directly between panels 17 and 15 axially offset from seam 11A or overlap region 140 on the opposite side of seam 11A or overlap region 140; a portion of segment 28D is directly between panels 17 and 19 in overlap region 140; a portion of plate 30 and a portion of plate 32 inside pathway 9 are directly between panels 17 and 19 in overlap region 140 and directly between panels 15 and 19 in overlap region 140; a portion of plate 30 and a portion of plate 32 inside pathway 9 are directly between panels 15 and 19 axially offset from seam 11A/overlap region 140 (and thus not directly between panels 17 and 19) because said portions of plate 30 and 32 extend axially outwardly beyond edge 142 of panel 17 away from edge 144 of panel 19; a portion of plate 32 outside pathway 9 extends axially outwardly beyond edge 144 of panel 19 away from edge 142 of panel 17 so that said portion overlaps a portion of panel 17 without overlapping any portion of panel 19; plate 84 is outside pathway 9 overlapping (directly above) panels 19, 17 and 15 in region 140; a portion of heater passage and welding tip or leg 99 including nozzle 94 and exit opening 96 are directly between panels 17 and 19 in region 140 and directly between panels 15 and 19 in region 140.

Once seam 11A is formed and incidental welds 146 are broken, sheet material continues downstream past weld breaker 40, between rollers 21 and 23, and may enter components 16 (FIG. 1) for further processing. The tube of sheet material 11 having back seam 11A typically remains in a substantially flat configuration as it moves downstream from rollers 21 and 23 out of the downstream end of welder 10 and into the components 16. Typically, components 16 include a bag bottomer which cuts the tubular sheet material 11 with back seam 11A into tubular pieces and forms a seam along one end of each tubular piece to form respective bottom edges of bags which includes seam 11A, whereby the bags may be filled with bulk materials during additional downstream bag formation processes 16.

Because back seam 11A may be welded by the use of heat and compression only, back seam 11A may be free of adhesives, stitching, meltable materials (e.g. hot melt glue) other than material 11 itself or any other material which is distinct or different from material 11. Thus, welder 10 allows for the rapid production of bags without the need for additional processes such stitching or the application of adhesives or hot melt glues etc. to produce the back seam.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:
1. A thermal welding apparatus comprising:
 a sheet material pathway adapted to allow sheet material to move downstream therethrough in a direction substantially parallel to a longitudinal axis of the pathway;
 a weld heater extending adjacent the pathway;
 a compression mechanism extending adjacent the pathway adjacent and downstream of the weld heater; and
 a weld breaker assembly which comprises a first axial leg upstream of the compression mechanism, a second axial leg downstream of the compression mechanism, and a longitudinal leg extending from the first axial leg to the second axial leg; wherein the longitudinal leg and the second axial leg together form an L-shaped member when viewed from above, wherein the L-shaped member is rigidly secured to and cantilevers from the first axial leg, and terminates in a free terminal end located downstream of the compression mechanism; wherein the second axial leg serves as a weld breaker which is within the pathway and adapted to disengage incidental welds created during formation of a longitudinally- oriented welded back seam of the sheet material as the sheet material is moving downstream through the pathway.

2. The apparatus of claim 1 wherein the weld breaker is a piece of sheet metal.

3. The apparatus of claim 1 wherein the weld breaker is part of a flat plate.

4. The apparatus of claim 1 further comprising a lip and a plate adjacent the weld heater which define therebetween a sheet edge receiving space adapted to receive therein an edge of the sheet material.

5. The apparatus of claim 1 wherein the first axial leg comprises a first portion outside the pathway and a second portion in the pathway; the second axial leg is entirely within the pathway; and the longitudinal leg is entirely within the pathway.

6. The apparatus of claim 1 wherein the longitudinal leg is a plate.

7. The apparatus of claim 1 wherein the first axial leg is a cantilevered rod.

8. The apparatus of claim 7 wherein the second axial leg and the longitudinal leg are configured as a plate.

9. The apparatus of claim 8 wherein the longitudinal leg is axially offset from the compression mechanism.

10. The apparatus of claim 9 wherein the compression mechanism comprises a pair of pinch rollers; and the longitudinal leg is axially offset from the pinch rollers.

11. The apparatus of claim 1 further comprising a preheater assembly extending within the sheet material pathway upstream of the weld heater.

12. The apparatus of claim 11 further comprising a separation shaft extending into the sheet material pathway adjacent and upstream of the preheater assembly.

13. The apparatus of claim 12 further comprising first and second rollers adjacent and upstream of the separation shaft; wherein the rollers define therebetween a portion of the pathway.

14. The apparatus of claim 1 wherein the compression mechanism comprises a pair of pinch rollers defining therebetween a portion of the pathway.

15. The apparatus of claim 1 further comprising a heater shield assembly which defines a heater passage within the pathway; and a portion of the weld heater in the heater passage.

16. The apparatus of claim 15 wherein the heater shield assembly comprises first and second shield plates which extend within the pathway and define therebetween the heater passage.

17. The apparatus of claim 16 wherein the shield plates taper towards each other from upstream to downstream.

18. The apparatus of claim 16 wherein the heater shield assembly comprises a lip adjacent the first shield plate so that the lip and first shield plate define therebetween a sheet edge receiving space adapted to receive therein an edge of the sheet material.

19. A combination comprising:
flexible thermoplastic sheet material in a tubular configuration comprising first and second superimposed panels, wherein the second panel includes a longitudinally-oriented overlap region comprising a first edge segment of the first panel and a second edge segment of the second panel, wherein the second edge segment overlaps the first edge segment;
a thermal welding apparatus through which the sheet material is movable downstream;
a weld heater of the thermal welding apparatus extending adjacent the overlap region;
a compression mechanism of the thermal welding apparatus which is adjacent and downstream of the weld heater and which compresses the first and second edge segments and the first panel;
a longitudinally-oriented welded back seam formed between the first and second edge segments downstream of the compression mechanism;
incidental welds formed between the welded back seam and the first panel; and
a weld breaker assembly which comprises a first axial leg upstream of the compression mechanism and a second axial leg downstream of the compression mechanism, and a longitudinal leg extending from the first axial leg to the second axial leg; wherein the longitudinal leg and the second axial leg together form an L-shaped member when viewed from above, wherein the L-shaped member is rigidly secured to and cantilevers from the first axial leg, and terminates in a free terminal end located downstream of the compression mechanism; wherein the first axial leg extends between the first and second edge segments, the second axial leg extends between the welded back seam and the first panel, and the second axial leg serves as a weld breaker which disengages the incidental welds as the sheet material moves downstream.

* * * * *